Dec. 5, 1967  I. S. HARALAMPIEV ET AL  3,355,752
TAPPING TOOL
Filed Aug. 4, 1965
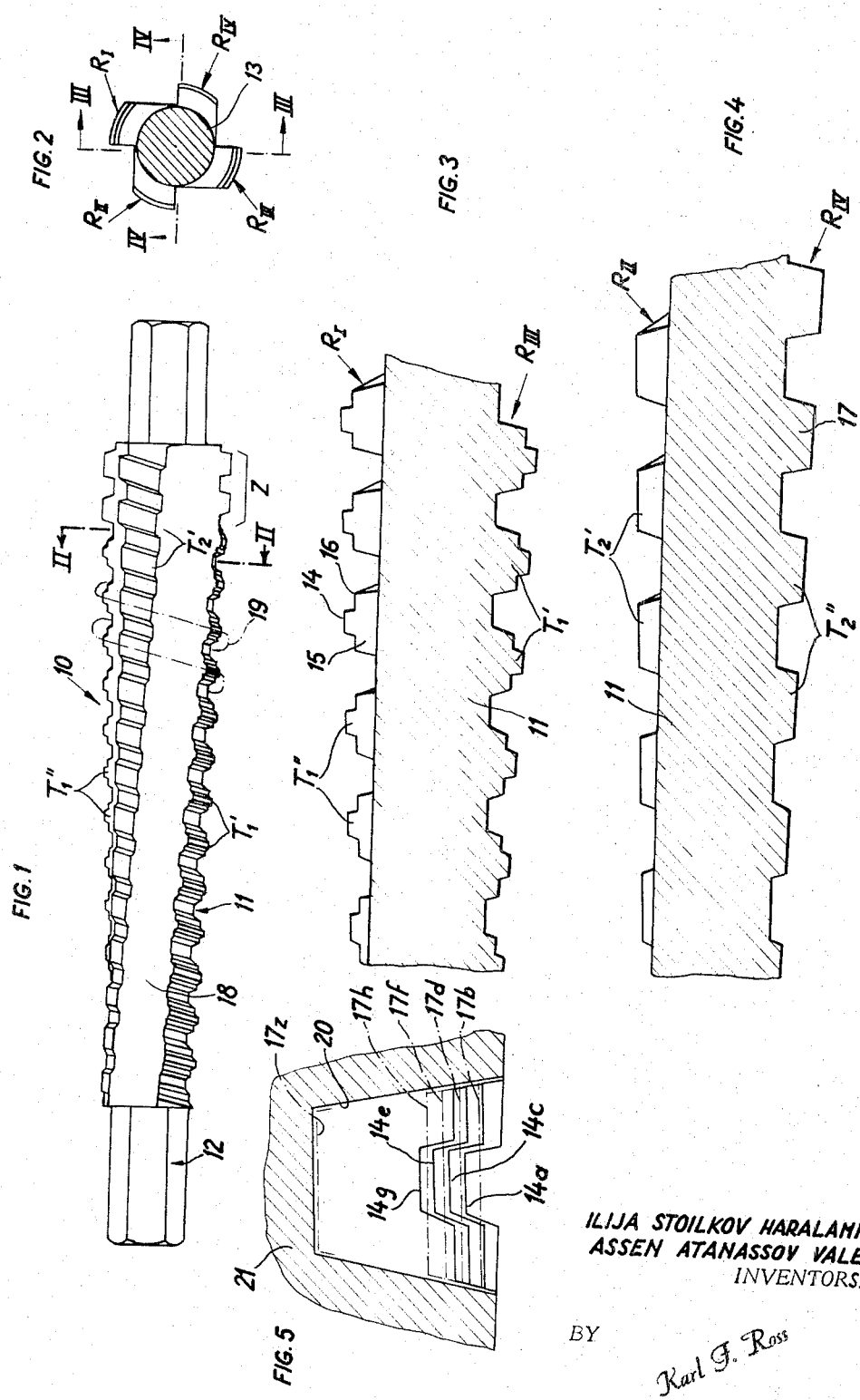
ILIJA STOILKOV HARALAMPIEV
ASSEN ATANASSOV VALEV
INVENTORS.
BY Karl F. Ross
Attorney

United States Patent Office 3,355,752
Patented Dec. 5, 1967

3,355,752
TAPPING TOOL
Ilija S. Haralampiev and Assen A. Valev, Sofia, Bulgaria, assignors to Nautchno-Izsledovatelski i Proektnokonstruktorski Institut za Metalo-Obrabotvashti Mashini i Instrumenti, Sofia, Bulgaria, a corporation of Bulgaria
Filed Aug. 4, 1965, Ser. No. 477,215
4 Claims. (Cl. 10—141)

ABSTRACT OF THE DISCLOSURE

Tapping tool for internal thread-cutting with two types of teeth alternately arranged in respective rows along an elongated tool body, the teeth of each row increasing progressively in height from one end of the body to the other, the teeth of one type having a stepped outline with a central land rising above a pair of outer lands, the teeth of the second type having a substantial trapezoidal outline and a width approximately equal to that of a stepped tooth immediately succeeding the trapezoidal tooth along a helical line of cut, the height of the trapezoidal tooth being substantially equal to that of the outer lands of the immediately succeeding stepped tooth.

---

Our present invention relates to a tapping tool for the cutting of internal threads in a nut or a similar workpiece.

The tapping of nuts is conventionally accomplished with the aid of a generally cylindrical tool having peripheral teeth disposed along a helicoidal line whose pitch corresponds to that of the thread to be cut, these teeth increasing progressively in height along the helix so as gradually to deepen the helical groove they produce.

In many cases, particularly in the cutting of heavy threads, the teeth of the tool encounter considerable friction so that there can be only a slight increase in height from one tooth to the next and the tool must be of considerable length or must be subdivided into separate implements to be used at different stages, e.g. for preshaping, cutting to tolerance and finishing of the thread. Both alternatives are inconvenient when the threading is to be done by automatic means, e.g. by a machine wherein a tool support with a pair of confronting and positively driven grippers is longitudinally displaceable relatively to a workpiece support.

Other difficulties encountered with such tools relate to the removal of chips which, unless suitable fragmented and discharged through the clearances left between the teeth, interfere with the cutting operation and may even lead to the destruction of one or more teeth.

It is, therefore, the general object of our present invention to provide an improved tapping tool of the character described which avoids the above drawbacks.

In accordance with our invention, the teeth of such a tool are alternately of a first and a second shape and are arrayed in several peripherally spaced rows extending in a generally longitudinal direction from one end of the tool body to the other, one shape of teeth being characterized by a stepped outline with a central land rising above a pair of flanking outer lands, the other shape having a substantially trapezoidal outline of a base width which substantially equals the base width of the outline of an adjoining tooth of the first-mentioned shape; the height of a tooth of trapezoidal outline is substantially equal to that of the outer lands of an adjoining tooth of stepped outline.

Advantageously, the teeth are arranged in an even number of rows, with all the teeth of one row having the stepped shape, all the teeth of the next row having the trapezoidal shape, and so on in an alternating manner. If the number of rows is divisible by four, i.e. if there are an even number of pairs of such rows, diametrically opposite rows consist of teeth of the same shape. These rows, preferably, do not extend exactly longitudinally along the tool body but lie substantially perpendicularly to the turns of the helicoidal line along which successive teeth are located, thereby defining a slight pitch angle.

After the central land of a stepped tooth has cut a channel into the inner peripheral wall of the workpiece, the edge of the immediately succeeding trapezoidal tooth cuts away the material on both sides of this channel to preshape a thread-forming groove of desired profile. The outer lands of the immediately succeeding tooth deepen this groove only slightly, or merely serve to sweep away the chips, while the corresponding central land deepens the aforementioned channel preparatorily to a deepening of the remainder of the groove by the next-following trapezoidal tooth. In this manner the thread is cut to the necessary depth with relatively little frictional resistance so that the required number of cutting teeth can be accommodated, in most cases, on a single tool body. The tool may also carry a set of calibrating teeth of rectangular or trapezoidal shape corresponding to the desired thread profile.

The invention will be described in greater detail with reference to the accompanying drawing in which:

FIG. 1 is a side-elevational view of a tapping tool embodying the invention;

FIG. 2 is a cross-sectional view taken on the line II—II of FIG. 1;

FIGS. 3 and 4 are longitudinal sectional views taken, respectively, on the lines III—III and IV—IV of FIG. 2; and FIG. 5 is a greatly enlarged fragmentary sectional view of a workpiece, showing the profile of one of its turns with diagrammatic superposition of several tooth profiles.

The tool 10 shown in FIG. 1 comprises a central body portion 11 and two extremities 12, 13, these extremities being here shown formed with a polygonal shape so as to be more readily engageable by respective grippers of a tool holder which serves to rotate the tool about its axis in the threading of a workpiece as described in our copending application referred to above. It will be apparent that the shape of these extremities has otherwise no bearing upon the present invention.

The central body portion 11 is formed with two pairs of diametrically opposite rows of teeth progressively rising in height from the end 12 to the end 13. In FIG. 2 these rows have been generally designated $R_I$, $R_{II}$, $R_{III}$ and $R_{IV}$. Rows $R_I$ and $R_{III}$, shown more clearly in FIG. 3, are composed of teeth $T_1'$, $T_1''$ of a first shape, these teeth having a stepped profile constituted by a central land 14 flanked by a pair of outer lands 15, 16 of lesser height. Rows $R_{II}$, $R_{IV}$ consists of teeth $T_2'$, $T_2''$ of substantially trapezoidal shape formed with a single cutting edge 17, see particularly FIG. 4.

It will be noted that the rows of teeth $R_I$ to $R_{IV}$ include a slight pitch angle with reference to the generatrices of the substantially cylindrical body portion 11, these rows being separated by longitudinal channels 18 of similar pitch extending at right angles to the turns of a helicoidal line 19 along which the teeth $T_1'$, $T_2'$, $T_1''$, $T_2''$ follow one another in periodic succession. In FIG. 5 we have shown one of the turns of a helical groove 20 cut into a workpiece 21 by the tool 10 of FIG. 1, the outlines of successive teeth employed in the carving of this groove being indicated diagrammatically to illustrate the relative height of their respective cutting edges. Thus, we have depicted at 14a, 14c, 14e, 14g (full lines) the central lands of successively effective stepped teeth $T_1'$, $T_1''$ and at 17b, 17d, 17f, 17h (dot-dash lines) the cutting edges of trapezoidal teeth $T_2'$, $T_2''$ interleaved therewith. The outer lands have been drawn, for convenience, just below the levels of the cutting edges of immediately preceding trapezoidal teeth, yet it will be understood that in practice their heights may coincide or that the outer lands of a stepped tooth may even be slightly higher than the edge of the immediately preceding trapezoidal tooth. The alphabetical postscripts $a$, $b$ etc. indicate, of course, the order of succession of the several tooth profiles shown in FIG. 5. A calibrating zone Z (FIG. 1) of tool 10 has all its teeth formed with a profile 17z to produce the ultimate shape of the groove 20.

It will be apparent that the total number of teeth, the number of rows, the pitch angle and other structural details can be varied without departing from the spirit and scope of the invention as defined in the appended claims.

We claim:

1. A tapping tool for the cutting of internal threads, comprising an elongated substantially cylindrical body with several peripherally spaced rows of teeth extending in a generally longitudinal direction from one end of said body to the other, the teeth of adjacent rows respectively comprising teeth of a first shape and teeth of a second shape alternating with mutual peripheral spacing along a helicoidal line, said first shape having a stepped outline with a central land rising above a pair of outer lands flanking said central land, said second shape having a substantially trapezoidal outline of a base width substantially equal to that of the outline of an adjoining tooth of said first shape and of a height substantially equal to that of said outer lands of said adjoining tooth, said teeth of said first shape and said teeth of said second shape progressively increasing in height along said helicoidal line and from one end of the body to the other, any tooth of said first shape having a height greater than that of two teeth of said second shape immediately preceding and succeeding same, respectively, along said helicoidal line.

2. A tool as defined in claim 1 wherein said teeth are divided into an even number of pairs of diametrically opposite rows formed from teeth of the same shape.

3. A tool as defined in claim 1 wherein said rows extend at a slight pitch angle with reference to generatrices of said body.

4. A tapping tool for the cutting of internal threads, comprising an elongated substantially cylindrical body with several peripherally spaced rows of teeth extending in a generally longitudinal direction from one end of said body to the other, the teeth of adjacent rows respectively comprising teeth of a first shape and teeth of a second shape alternating with mutual peripheral spacing along a helicoidal line, said first shape having a stepped outline with a central land rising above a pair of outer lands flanking said central land, said second shape having a substantially trapezoidal outline of a base width substantially equal to that of the outline of an adjoining tooth of said first shape and of a height substantially equal to that of said outer lands of said succeeding tooth but less than that of said central land of a pair of teeth of said first shape immediately preceding and immediately succeeding, respectively, a tooth of said second shape along said helicoidal line.

References Cited

FOREIGN PATENTS 314,571    1/1934    Italy.
72,667    10/1930    Switzerland.

FRANCIS S. HUSAR, *Primary Examiner.*